(12) United States Patent
Hunneyball

(10) Patent No.: US 6,278,687 B1
(45) Date of Patent: Aug. 21, 2001

(54) MA ALTERNATE ROUTEING

(75) Inventor: Timothy J Hunneyball, Nottingham (GB)

(73) Assignee: Marconi Communications Limited (GB)

( * ) Notice: Subject to any disclaimer, the term of this patent is extended or adjusted under 35 U.S.C. 154(b) by 0 days.

(21) Appl. No.: 09/040,616

(22) Filed: Mar. 18, 1998

(30) Foreign Application Priority Data

Jul. 31, 1997 (GB) .................................................. 9716195

(51) Int. Cl.[7] .................................................. G06F 11/00
(52) U.S. Cl. .................................................. 370/217; 370/218
(58) Field of Search .................................. 370/217, 218, 370/227, 228, 225, 254–256, 392, 401

(56) References Cited

U.S. PATENT DOCUMENTS

| | | | |
|---|---|---|---|
| 5,251,205 | * 10/1993 | Callon et al. | 370/392 |
| 5,430,727 | * 7/1995 | Callon | 370/401 |
| 5,590,118 | * 12/1996 | Nederlof | 370/218 |
| 5,678,178 | * 10/1997 | Tahkokorpi | 370/375 |
| 6,055,226 | * 4/2000 | Verpooten | 370/227 |

* cited by examiner

Primary Examiner—Salvatore Cangialosi
(74) Attorney, Agent, or Firm—Kirschstein, et al.

(57) ABSTRACT

In a Synchronous Digital Hierarchy (SDH) based communications network comprising a plurality of Intermediate Systems (IS), the IS being divided between at least one IS—IS Area and at least one non-IS—IS Area, an IS—IS Area being an area within which a routeing protocol forming part of the Network Layer (Layer 3) of the Open Systems Interconnection including routeing (OSI), is provided for routeing messages between areas, a method is provided wherein static routes (Manual Adjacencies (MA)) are created at IS within the IS—IS Area to point to routes to a group of one or more Network Equipments (NEs) within the non-IS—IS Area and where a failure occurs in a link to or within a group and messages from the IS—IS Area to the non-IS—IS Area are looped to the originating IS—IS Area, identification of the NEs from which messages have been looped are removed from the respective MAs allowing routeing of messages via alternative MAs.

2 Claims, 1 Drawing Sheet

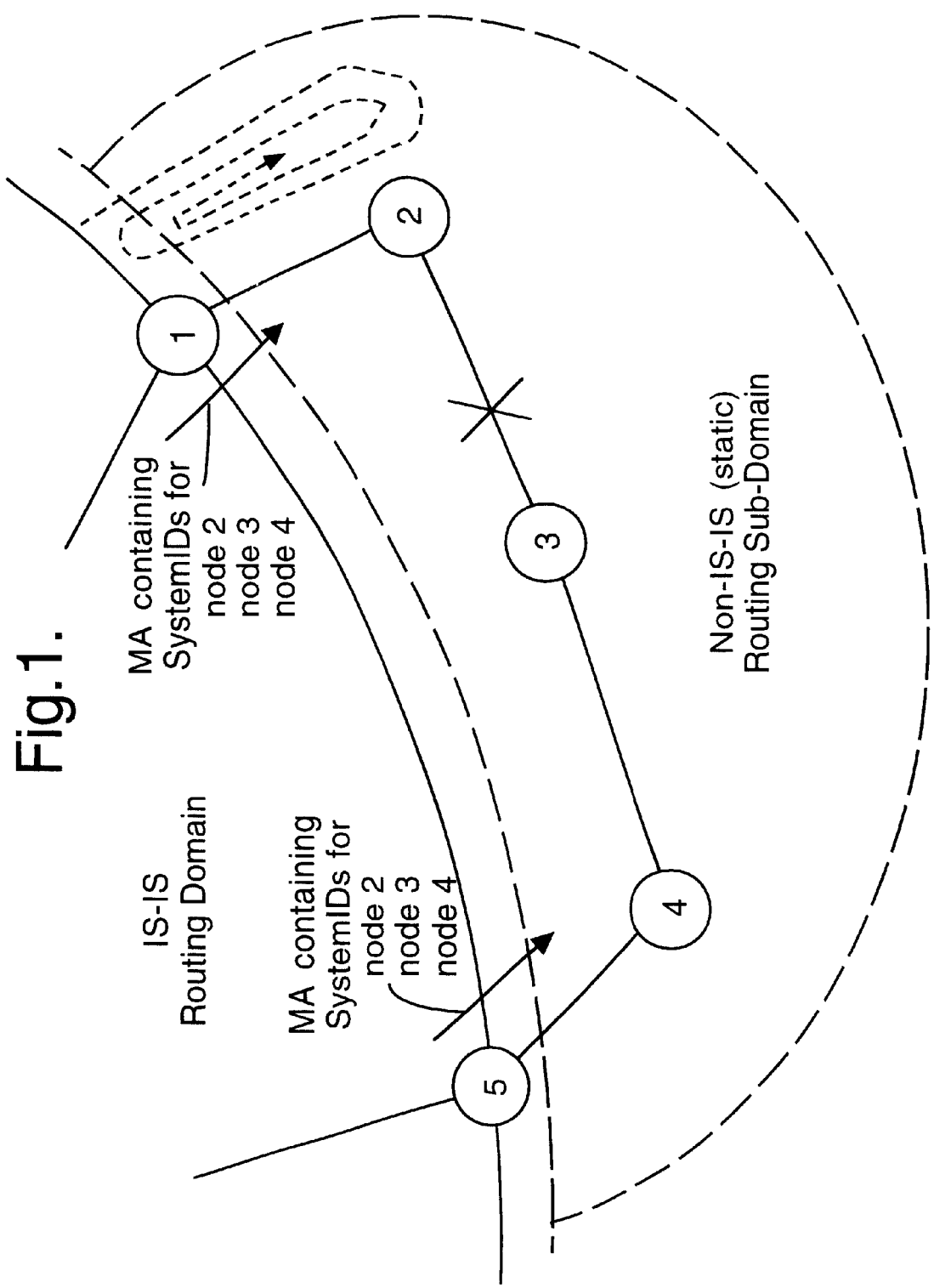

MA ALTERNATE ROUTEING

BACKGROUND OF THE INVENTION

Field of the Invention

Synchronous Digital Hierarchy (SDH) equipment is the latest generation of equipment that is used to provide high bandwidth communications capabilities for use between telephone exchanges and in other areas where high quality telecomms is required (broadcast video distribution, etc). Embedded within the 'traffic' carrying capability of the equipment are data communications channels (DCCs). These channels constitute a datacomms network that uses Open Systems Interconnections (OSI) protocols.

Each piece of equipment constitutes a routeing node in the datacomms network formed by the data channels, and can operate any one of a number of different methods. The present invention is concerned with the interworking of two of the possible routeing methods.

The two routeing methods that will commonly occur in SDH networks are IS—IS (ISO 10589) and quasi-static routeing (where alternate routes may be chosen on link failure). Where this occurs, routeing loops, causing loss of comms, can be caused. The present invention detects the formation of a routeing loop and changes the behaviour of the IS—IS node accordingly.

SUMMARY OF THE INVENTION

According to the present invention there is provided a Synchronous Digital Hierarchy (SDH) based communications network comprising a plurality of Intermediate Systems (IS), the IS being divided between at least one IS—IS Area and at least one non-IS—IS Area, an IS—IS Area being an area within which a routeing protocol forming part of the Network Layer (Layer 3) of the Open Systems Interconnection including routeing (OIS), is provided for routeing messages between areas, a method is provided wherein static routes (Manual Adjacencies (MA) are created at IS within the IS—IS Area to point to routes to a group of one or more Network Equipments (NEs) within the non-IS—IS Area and where a failure occurs in a link to or within a group and messages from the IS—IS Area to the non-IS—IS Area are looped to the originating IS—IS Area, identification of the NEs from which messages have been looped are removed from the respective MAS allowing routeing of messages via alternative MAS.

BRIEF DESCRIPTION OF THE DRAWINGS

The present invention will now be described by way of example, with reference to and as illustrated in the accompanying single FIGURE which illustrates in part the connection between an IS—IS Routeing Domain and a non-IS—IS (static) Routeing Sub-Domain.

DETAILED DESCRIPTION OF THE INVENTION

The IS—IS routeing protocol is one of a set of 'link state' dynamic routeing protocols. These protocols automatically distribute routeing information round the datacomms network, allowing nodes to learn the required routeing information from the actual network. This provides the ability to automatically reconfigure, allowing routeing round network faults, in case of network link failure.

The IS—IS routeing protocol has two routeing levels, Level-1 and Level-2. See FIG. 2 (from ISO 10589) for the use of these levels and the general environment of this protocol.

The present invention is also applicable to other datacomms scenarios, where a dynamic routeing protocol is interworked with static routeing, or a different dynamic protocol (e.g. OSPF and static routes, etc).

REFERENCE

ISO/IEC 10589: 1992 (E)
Information technology—Telecommunications and information exchange between systems—Intermediate system to Intermediate system intra-domain routeing information exchange protocol for use in conjunction with the protocol for providing the connectionless-mode Network Service (ISO 8473).

GLOSSARY

Area An IS—IS Level 1 routeing subdomain
ES End System—these systems deliver NPDUs to other systems and receive NPDUs from other systems but do not relay NPDUs
IS Intermediate System (a node where data may be routed on to another IS or to an End System (ES)
IS—IS The IS—IS intra-domain routeing protocol (see reference)
MA Manual Adjacency
NE Network Element
NPDU Network Layer Protocol Data Unit
NSAP Network Service Access Point (layer-3 address)
OSI Open Systems Interconnection
SID System ID—Part of the NSAP
Router An IS running IS—IS Level 1 Intermediate Systems deliver and receive NPDUs from other systems, and relay NPDUs from other source systems to other destination systems. They route directly to systems within their own area, and route towards a Level 2 Intermediate system when the destination system is in a different area.

Level 2 Intermediate Systems act as Level 1 Intermediate systems in addition to acting as a system in the subdomain consisting of Level 2 ISs. Systems in the Level 2 subdomain route towards a destination area, or another routeing domain.

References to the routeing of NPDUs are made with regard to NPDUs destined for NSAPs residing on NEs in the non-IS—IS subdomain.

IS—IS is a dynamic, link-state, routeing protocol, which can be included as part of the Network Layer (Layer-3) of the OSI Reference Model. For the purpose of this document, ISs running IS—IS will be termed Routers.

Routers can participate in two levels of routeing:
Level-1—For routeing within an Area
Level-2—For routeing between Areas Level 1 Routers provide the ability to enter static routes to allow Level-1 routeing to non-IS—IS NEs to be used. This static route is termed a Manual Adjacency (MA) and may be used to point to a single NE, or a group of NEs. A Level-1 Router, with a configured MA, propagates the details of the MA within its Level-1 Link-State information. Thus all Level-1 Routers gain information about all MA's configured within the Level-1 subdomain.

When the MA is used to point to a group of NEs, routeing failures in the non-IS—IS group, due to internal link failure in the group, can cause messages (NPDUs) to be looped back to the IS—IS NE containing the MA. This NE should then send the message back to the non-IS—IS group (from whence it came), causing a routeing loop, and subsequent loss of communications (the NPDU will loop until its lifetime expires and it is deleted). A second connection from the IS—IS domain, to this group of non-IS—IS NEs would be of no benefit in this case.

In FIG. 1:
1. Nodes 1 & 5 are IS—IS routers.
2. Nodes 2-4 are non-IS—IS routers.
3. MAs are used in nodes 1 & 5, each MA containing the System IDs of nodes 2-4.
4. The link between nodes 2 & 3 is broken.
5. The routeing for nodes 2-4 is via node 1 due to shortest path routing in the IS—IS Domain.

In the existing situation under ISO 10589, routeing is from node 1 to node 4, node 2 returns the message to node 1, which then sends it back to node 2 due to the MA. The message continues looping between nodes 1 & 2 until its lifetime expires and is deleted.

MA Alternate Routeing provides resilience when MAs are used to route to groups of non-IS—IS NEs, allowing benefit from the use of multiple connections between the IS—IS domain and the group of non-IS—IS NEs. It achieves the resilience by controlling the state of the advertising of the Manual Adjacencies. On detection of the looping of messages due to a link break in the non-IS—IS group, the IDs of the NEs for which messages have been 'looped' are removed from the IS—IS Level-1 advertising process (link state information). This allows the MAs in the alternate interdomain connections to be selected instead.

Manual Adjacencies that point to groups of NEs contain a list of the System IDs (part of the overall NSAP) of the non-IS—IS NEs, the MA also contains the port to be used to reach these NEs. When a break occurs in the non-IS—IS group, a number of NEs may become unreachable and cause messages to be looped.

When a message (NPDU) is received on a port to which it will become routed (according to the MA), the System ID of the Destination NSAP of the NPDU is removed from the SID list of the MA. To do this, the MA will first be taken 'down' it will be taken back 'up' when the SID has been removed.

To avoid the MA "flapping up and down" as the unreachability is detected for each SID in the MA, a Hold-Off timer (16-32s) is used. This allows the collection of all SIDs associated with the break, before the MA is taken down for the removal of the SIDs.

To allow the SID to be reinstated, automatically, after the recovery of the failure, the SID is reinstated on the expiry of a single, jittered, Recovery Timer (approx. 5 mins). This is only done, however, if no other route exists for the destination node, in the IS—IS domain.

The present invention is also applicable to other Link-State dynamic routeing protocols, that use static routes to interwork with dissimilar routeing protocols.

Referring again to FIG. 1, with the present invention routeing is from node 1 to node 4, the first time a message is sent back from node 2 to node 1 (due to the break), the loop is detected and the System ID of node 4 is removed from the MA in node 1. The change in the MA in node 1 will then be propagated to the IS—IS Level-1 subdomain. All the Level-1 routers in this AREA will then recalculate their routes. There will now be a route to node 4 via node 5. Messages sent to node 4 before the recalculation has taken place will probably be lost in the network. This is covered by the recovery mechanisms in upper layer protocols (layer-4 say).

What I claim is:

1. A synchronous digital hierarchy (SDH) based communications network, comprising:
   a) a plurality of data communications channels embedded within the network;
   b) a plurality of intermediate systems (IS) divided between at least one non-IS—IS area and at least one IS—IS area within which a routing protocol forming part of a network layer of an open systems interconnection (OSI) is provided for routing a message from said at least one IS—IS area to a destination IS within said at least one non-IS—IS area, there being a plurality of connections between said at least one IS—IS area and said at least one non-IS—IS area;
   c) a plurality of manual adjacencies (MAs) constituting static routes at one of the IS within said at least one IS—IS area, for identifying routes to at least one network equipment (NE) within said at least one non-IS—IS area; and
   d) means for removing an identification of said at least one NE from which the message has been returned from the MAs after at least one of the connections to the destination IS within said at least one non-IS—IS area was broken, and for allowing routing of the message via alternative MAs.

2. In a synchronous digital hierarchy (SDH) based communications network including:
   A) a plurality of data communications channels embedded within the network, and
   B) a plurality of intermediate systems (IS) divided between at least one non-IS—IS area and at least one IS—IS area within which a routing protocol forming part of a network layer of an open systems interconnection (OSI) is provided for routing a message from said at least one IS—IS area to a destination IS within said at least one non-IS—IS area, there being a plurality of connections between said at least one IS—IS area and said at least one non-IS—IS area, a method of routing the message, comprising the steps of:
   a) creating a plurality of manual adjacencies (MAs) constituting static routes at one of the IS within said at least one IS—IS area to allow routing to at least one network equipment (NE) within said at least one non-IS—IS area;
   b) returning the message from the MAs to said at least one IS—IS area after at least one of the connections to the destination IS within said at least one non-IS—IS area was broken; and
   c) removing an identification of said at least one NE from which the message has been returned from the MAs, and allowing routing of the message via alternative MAs.

* * * * *